March 22, 1949.   D. R. CONRAD ET AL   2,465,065
TRAILER HITCH
Filed July 10, 1945
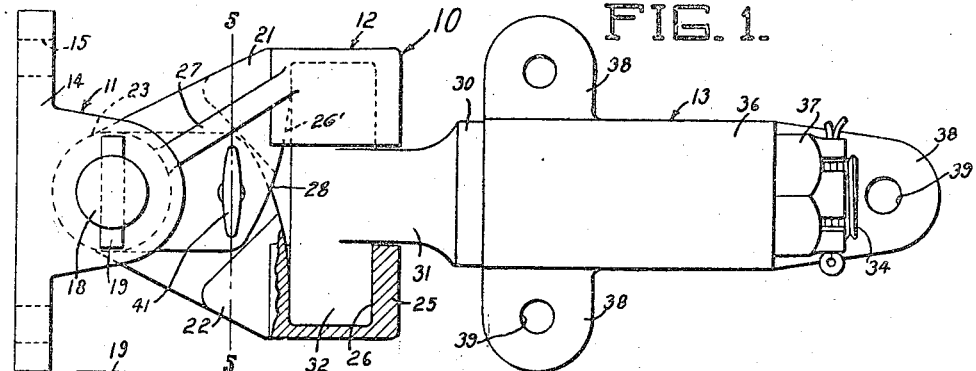
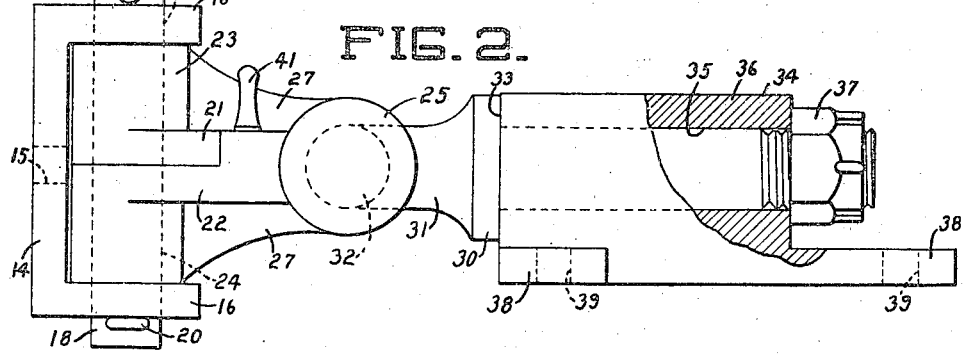
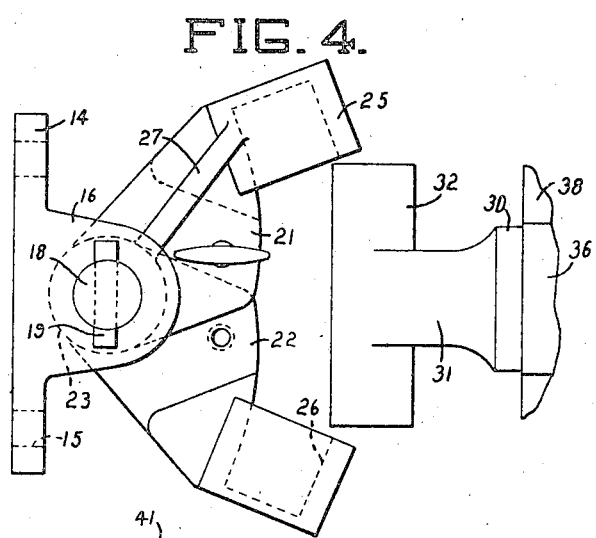
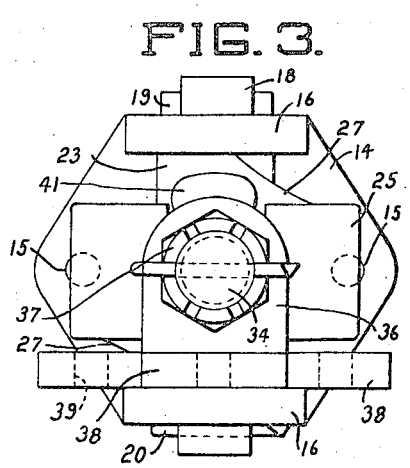
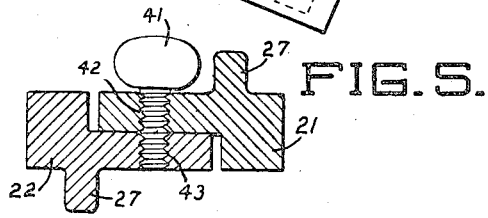
INVENTORS:
D. R. Conrad &
F. M. Reynolds
BY   ATTORNEY.

Patented Mar. 22, 1949

2,465,065

UNITED STATES PATENT OFFICE 2,465,065

TRAILER HITCH

Delmar R. Conrad and Frank M. Reynolds, San Gabriel, Calif.

Application July 10, 1945, Serial No. 604,184

3 Claims. (Cl. 280—33.15)

1

This invention relates to trailer hitches.

The general object of the invention is to provide a novel detachable trailer hitch.

A more specific object of the invention is to provide a trailer hitch including novel coacting members for mounting upon a tractor and a trailer.

Another object of the invention is to provide a novel means for connecting the base member and pull member of a trailer hitch.

Another object of the invention is to provide a novel swivel for a trailer hitch.

Other objects and the advantages of our invention will be apparent from the following description taken in connection with the accompanying drawings, wherein:

Fig. 1 is a top plan view, partly in section, showing a trailer hitch embodying features of our invention;

Fig. 2 is a side elevation, partly in section;

Fig. 3 is a front end view;

Fig. 4 is a top plan view with parts broken away; and

Fig. 5 is a section taken on line 5—5, Fig. 1.

Referring to the drawings by reference characters we have shown our invention as embodied in a trailer hitch which is indicated generally at 10. As shown the hitch includes a base 11, a connecting swivel member 12 and a pull member 13.

The base 11 includes a body 14 having apertures 15 through which fastening members may be passed to secure the base to a tractor such as a motor vehicle. The base includes a pair of ears 16 which are apertured as at 17 to receive a pin 18. One end of this pin is provided with a headed portion 19 while the other end is provided with a removable fastening member 20 so that the pin is held firmly in place.

The connecting swivel member 12 includes a pair of arms 21 and 22 which are similar in construction and each of which is provided with a boss 23 at one end which is apertured as at 24 to receive the pin 18 previously mentioned. The arms include an enlarged end portion 25 and each enlarged portion is provided with a cylindrical recess 26, with the recesses opposed as shown in Fig. 1. Each of the arms 21 is preferably provided with a reinforcing rib 27 as shown in the drawings.

The pull member 13 includes a body 30 having a reduced forward portion 31 which includes a transversely headed portion 32 which is cylindrical and which projects from each side of the portion 31 and is seated in the recess 26 previously described.

2

The pull member includes a shoulder 33 and a reduced portion 34 which is fitted in a recess 35 in a bracket 36. A nut 37 engages the threaded end of the portion 34 to hold the parts assembled. The bracket 36 includes side and end ears 38 which are apertured as at 39 to receive fastening members for holding the bracket on a trailer or other vehicle.

In operation the body portion 14 of the base 11 is preferably mounted on the tractor and the bracket 36 is mounted on a trailer. The parts are then brought together as shown in Fig. 4, whereupon further relative movement of the parts towards each other causes the portions 32 to enter the recess 26. The arms are thereupon moved to the position shown in Fig. 1, after which a fastening member shown as a tongue screw 41, which is threaded in the one bracket as at 42, is screwed down so that it passes through another threaded aperture 43 to hold the parts assembled against accidental removal. In order to facilitate movement of the pull member body in and out of the recesses 26, the side of these recesses, nearer the fulcrum pin 18, are outwardly flared, substantially as indicated at 26'.

After the parts are so assembled, when the tractor is pulled, it will cause the pull member and bracket to be pulled, and the axis of the pin 18 being at right angles to the axis of the cylindrical portions 32, the construction provides a universal joint action, thus allowing sufficient play between the various parts.

From the foregoing description it will be apparent that we have invented a novel trailer hitch which can be economically manufactured and which is highly efficient in use.

We claim:

1. In a trailer hitch, a perforated base, a pivot seated in the perforation of said base, a pair of arms mounted for rotation on said pivot in a horizontal plane, there being opposed cylindrical recesses in the outer ends of said arms, the arms being relatively rotatable to bring said recesses into axial alignment, a pull member comprising a cylindrical body terminating at one end thereof in a cylindrical head transversely positioned thereon, the laterally projecting cylindrical portions of said head being of a size to fit snugly within the recesses of said arms and being insertable thereinto when the arms are in open position, closing movement of the arms causing the head to seat snugly within the recesses for rotating movement in a vertical plane, and means for locking the arms against relative rotating movement.

2. A trailer hitch comprising two members interconnectable to form a universal joint, one member including two arms independently rotatable on a common axis, said arms having at the outer free end thereof opposed cylindrical recesses, the other member including a bracket, a cylindrical body rotatable within said bracket, said body terminating in a cylindrical head transversely positioned thereon, and of a size to enter said recesses while the arms are spread open, closing movement of the arms causing the head to become snugly seated within the recesses for rotation therein in a plane perpendicular to the plane of rotation of said arms.

3. A trailer hitch comprising two members interconnectable to form a universal joint, one member including two arms independently rotatable on a common axis, said arms having at the outer free end thereof opposed cylindrical recesses, the other member including a bracket, a cylindrical body rotatable within said bracket, said body terminating in a cylindrical head transversely positioned thereon and of a size to enter said recesses while the arms are spread open, closing movement of the arms causing the head to become snugly seated within the recesses for rotation therein in a plane perpendicular to the plane of rotation of said arms, and means for locking said arms against relative rotation when snugly encompassing the said head.

DELMAR R. CONRAD.
FRANK M. REYNOLDS.

REFERENCES CITED

The following references are of record in the file of this patent:

UNITED STATES PATENTS

| Number | Name | Date |
|---|---|---|
| 1,650,838 | Jensen | Nov. 29, 1927 |
| 2,124,467 | Lyman | July 19, 1938 |
| 2,248,005 | Lyman | July 1, 1941 |